United States Patent
Matsumoto et al.

(10) Patent No.: US 8,388,185 B2
(45) Date of Patent: Mar. 5, 2013

(54) IMAGE DISPLAY DEVICE

(75) Inventors: Takahiro Matsumoto, Tokyo (JP); Makoto Tomita, Shizuoka (JP)

(73) Assignee: Stanley Electric Co., Ltd., Tokyo (JP)

(*) Notice: Subject to any disclaimer, the term of this patent is extended or adjusted under 35 U.S.C. 154(b) by 472 days.

(21) Appl. No.: 12/519,966

(22) PCT Filed: Nov. 28, 2007

(86) PCT No.: PCT/JP2007/072901
§ 371 (c)(1),
(2), (4) Date: Jun. 18, 2009

(87) PCT Pub. No.: WO2008/078494
PCT Pub. Date: Jul. 3, 2008

(65) Prior Publication Data
US 2009/0310382 A1    Dec. 17, 2009

(30) Foreign Application Priority Data
Dec. 22, 2006    (JP) ................. 2006-345432

(51) Int. Cl.
*F21S 6/00* (2006.01)

(52) U.S. Cl. .......... 362/257; 362/556; 362/583; 385/15; 385/27; 385/30

(58) Field of Classification Search .......... 362/559; 385/30
See application file for complete search history.

(56) References Cited

U.S. PATENT DOCUMENTS

| 7,039,287 | B2* | 5/2006 | Takagi et al. ............... 385/129 |
| 7,120,332 | B1* | 10/2006 | Spoonhower et al. .......... 385/25 |
| 7,400,797 | B2* | 7/2008 | Bhagavatula et al. .......... 385/32 |
| 7,729,576 | B2* | 6/2010 | Kornilovich et al. .......... 385/32 |
| 2003/0231369 | A1* | 12/2003 | Sugiyama et al. ............. 359/237 |
| 2006/0072875 | A1* | 4/2006 | Bhagavatula et al. .......... 385/30 |
| 2007/0230870 | A1* | 10/2007 | Smith et al. ................ 385/32 |
| 2008/0001062 | A1* | 1/2008 | Gunn et al. ................. 250/206 |

FOREIGN PATENT DOCUMENTS

| AT | 20077906121 | * 11/2007 |
| JP | 2001-282141 | 10/2001 |
| JP | 2003-501674 | 1/2003 |
| JP | 2005-316274 | 11/2005 |

* cited by examiner

*Primary Examiner* — Robert May
*Assistant Examiner* — Bryon T Gyllstrom
(74) *Attorney, Agent, or Firm* — Rankin, Hill & Clark LLP

(57) ABSTRACT

An image display device comprises a light-emitting unit (1), an optical fiber (2) which transmits light emitted from the light-emitting unit, and a plurality of spheres (3) disposed so as to be coupled to the optical fiber (2) by evanescent coupling and having optical transparency. Each of the spheres (3) produces an optical mode in which light entering each sphere from the optical fiber (2) by the evanescent coupling is confined inside, and are so formed that predetermined resonant frequencies of the spheres for producing the optical mode are different from one another, so that an image is displayed by the light emitted from the spheres (3). This provides a simply structured image display device having a high response speed and capable of achieving power saving, a high luminance, a wide view angle, and a high contrast.

18 Claims, 8 Drawing Sheets

IMAGE DISPLAY DEVICE

TECHNICAL FIELD

The present invention relates to an image display device using spheres having optical transparency.

BACKGROUND ART

As conventional image display devices, there are known flat panel displays such as a liquid-crystal display (LCD), a plasma display, and an organic EL display (refer to, for example, "Thorough comparison of LCD, PDP, and organic EL display," Kogyo Chosakai Publishing, Inc.).

The LCD displays an image by applying voltages to the liquid crystal to change the orientation thereof and blocking or transmitting light from a light source such as a backlight using a polarizing filter. The LCD, however, has problems such as a low response speed which is caused by the time required for the orientation change of the liquid crystal, a narrow view angle, a low contrast in a dark place, high power consumption which is caused by a requirement for some backlight luminance (for example, 10000 $cd/m^2$) to secure display luminance due to low optical transmittance, from the principle of the liquid crystal. Moreover, a high-definition LCD has a problem of high power consumption caused by a requirement for a higher luminance backlight due to a decrease in size of pixels of the display.

Furthermore, the plasma display displays an image by discharging in a cell filled with Xe gas, exciting RGB phosphors using ultraviolet rays in the vacuum ultraviolet region (140 nm), and forming display pixels. Accordingly, the plasma display has problems such as too large pixels inappropriate for a small-sized display, a short lifetime which is caused by the light in the vacuum ultraviolet region having large light energy of 7 to 8 eV that inevitably leads to deterioration of the phosphors applied or evaporated in the pixels, and high power consumption during operation which is caused by a low energy conversion efficiency of a conversion from the ultraviolet rays in the vacuum ultraviolet region to visible light.

Moreover, the organic EL display displays an image by applying or evaporating an organic light-emitting material that emits light by voltage application onto a substrate having optical transparency and then applying a DC voltage. Due to the properties of the organic light-emitting material, the organic EL display has problems such that: the lifetime of the organic light-emitting material is not secured; the organic light-emitting material is extremely sensitive to humidity; power consumption is high since there is no efficient organic light-emitting material; it is difficult to form a film of the organic light-emitting material uniformly over a large area; and the organic light-emitting material is expensive.

DISCLOSURE OF THE INVENTION

Problem to be Solved by the Invention

In view of the above problems, it is an object of the present invention to provide a simply structured image display device having a high response speed and capable of achieving power saving, a high luminance, a wide view angle, and a high contrast.

Means for Solving the Problems

According to an aspect of the present invention, there is provided an image display device comprising: a light-emitting unit; an optical fiber which transmits light emitted from the light-emitting unit; and a plurality of spheres disposed so as to be coupled to the optical fiber by evanescent coupling and having optical transparency, wherein: a plurality of the spheres each produce an optical mode in which light entering each sphere from the optical fiber by the evanescent coupling is confined inside and are so formed that predetermined resonant frequencies of the spheres for producing the optical mode are different from one another; and an image is displayed by the light emitted from a plurality of the spheres (First embodiment).

According to the image display device, the light-emitting unit is only required to be capable of emitting light to the optical fiber and therefore may be an easily available, high-powered, and efficient light emitter such as, for example, a semiconductor laser. Moreover, the light is converted into an optical mode in which the light propagating through the optical fiber enters each sphere by the evanescent coupling and is confined inside the sphere, and therefore the light in the optical fiber is able to rapidly enter the sphere without loss and the light is efficiently used for the image display.

Further, since the spheres are so formed that the predetermined resonant frequencies of the spheres are different from one another, light can be caused to enter particular spheres from the optical fiber by controlling the frequencies of the light emitted from the light-emitting unit and propagating through the optical fiber, so that an image is displayed by the light emitted from the spheres. The control of the frequencies of the light is executable at high speed by optical frequency modulation, for example, using the electrooptic effect. Moreover, the image is displayed by emitting light only from the predetermined spheres, thereby enabling the display of a high-contrast image. Furthermore, the spheres are able to emit light in various directions and the optical fiber and a plurality of the spheres can be disposed in various arrangements. Accordingly, the image display device achieves a wide view angle and a high degree of freedom in size and shape of the device.

Therefore, the present invention provides a simply structured image display device having a high response speed and capable of achieving power saving, a high luminance, a wide view angle, and a high contrast.

Further, in the image display device of the first embodiment, preferably a plurality of the spheres are so formed that the diameters of the spheres are different from one another (Second embodiment). In this case, the predetermined resonant frequencies of the spheres depend on the diameter, thereby enabling the spheres to be so formed that the resonant frequencies are different from one another.

Further, in the image display device of the first embodiment, preferably a plurality of the spheres are so formed that the refractive indices of the spheres are different from one another (Third embodiment). In this case, the predetermined resonant frequencies of the spheres depend on the refractive index, thereby enabling the spheres to be so formed that the resonant frequencies are different from one another.

Still further, in the image display devices of the first to third embodiments, preferably the light-emitting unit includes: a light emitter which emits light having a predetermined frequency; and a frequency modulator which modulates the light emitted from the light emitter to frequencies corresponding to the predetermined resonant frequencies of a plurality of the spheres, and light is caused to be emitted from spheres having the predetermined resonant frequencies among a plurality of the spheres (Fourth embodiment). In this case, the frequency modulator is capable of performing high-speed optical frequency modulation, for example, by using the electrooptic effect. Thereafter, the frequency modulator modulates the frequency of the light emitted from the light emitter, thereby enabling light to be emitted from the spheres having the predetermined resonant frequencies and thus enabling the image display by lighting particular spheres.

Further, in the image display devices of the first to fourth embodiments, preferably the light-emitting unit includes light emitters which emit light of red, blue, and green colors, respectively, a plurality of the spheres are divided into three groups: a plurality of red spheres that emit red light propagating from the light-emitting unit; a plurality of blue spheres that emit blue light propagating from the light-emitting unit; and a plurality of green spheres that emit green light propagating from the light-emitting unit, and a color image is displayed by the light emitted from the red spheres, the blue spheres, and the green spheres (Fifth embodiment). In this case, the color image can be displayed by arranging the red, blue, and green spheres in combination with one another and controlling the lighting intensities of the spheres of the respective colors and the lighting time proportions.

Alternatively, in the image display devices of the first to fourth embodiments, preferably the light-emitting unit includes light emitters that emit light other than red, blue, and green light, and a plurality of the spheres contain phosphors that exhibit predetermined color emission by absorbing the light propagating from the light-emitting unit, so that an image is displayed by the emission (Sixth embodiment). In this case, the image can be easily displayed by using the light emitters that emit light other than visible light.

Further, in the image display device of the sixth embodiment, preferably a plurality of the spheres are divided into three groups: a plurality of red spheres each containing a phosphor that exhibits red emission; a plurality of blue spheres each containing a phosphor that exhibits blue emission; and a plurality of green spheres each containing a phosphor that exhibits green emission, and a color image is displayed by the light emitted from the red spheres, the blue spheres, and the green spheres (Seventh embodiment). In this case, the color image can be displayed by arranging the red, blue, and green spheres in combination with one another and controlling the lighting intensities of the spheres of the respective colors and the lighting time proportions.

Moreover, in the image display devices of the sixth and seventh embodiments, preferably the light emitters are infrared lasers, and the phosphors are up-conversion phosphors that emit light at frequencies higher than an excitation frequency (Eighth embodiment). Specifically, a plurality of the spheres each produce the optical mode in which light entering each sphere from the optical fiber by the evanescent coupling is confined inside the sphere, and therefore the light energy inside the sphere is large enough to extract optical nonlinear effect. Therefore, the emission energy relative to the input light energy nonlinearly increases, thereby efficiently producing high energy light. Accordingly, even in the case of using infrared lasers which emit low energy infrared light as light emitters, visible light can be emitted by efficiently exciting the up-conversion phosphors. This provides easy formation of the image display device using generally inexpensive infrared lasers.

Further, in the image display devices of the first to fourth embodiments, preferably the light-emitting unit includes light emitters that emit light of a predetermined color among red, blue, and green, a plurality of the spheres are divided into two groups: a plurality of spheres having a predetermined color that emit light propagating from the light-emitting unit; and a plurality of spheres having colors other than the predetermined color and containing phosphors that exhibit emission of colors other than the predetermined color among red, blue, and green by absorbing the light propagating from the light-emitting unit, and a color image is displayed by the light emitted from the spheres having the predetermined color and the spheres having the colors other than the predetermined color (Ninth embodiment). In this case, it is possible to directly use the light of the predetermined color emitted from the light emitters for the image display and to obtain the colors other than the predetermined color by the emission of the phosphors, thereby enabling efficient image display.

BEST MODE FOR CARRYING OUT THE INVENTION

First Embodiment

Figure 1:
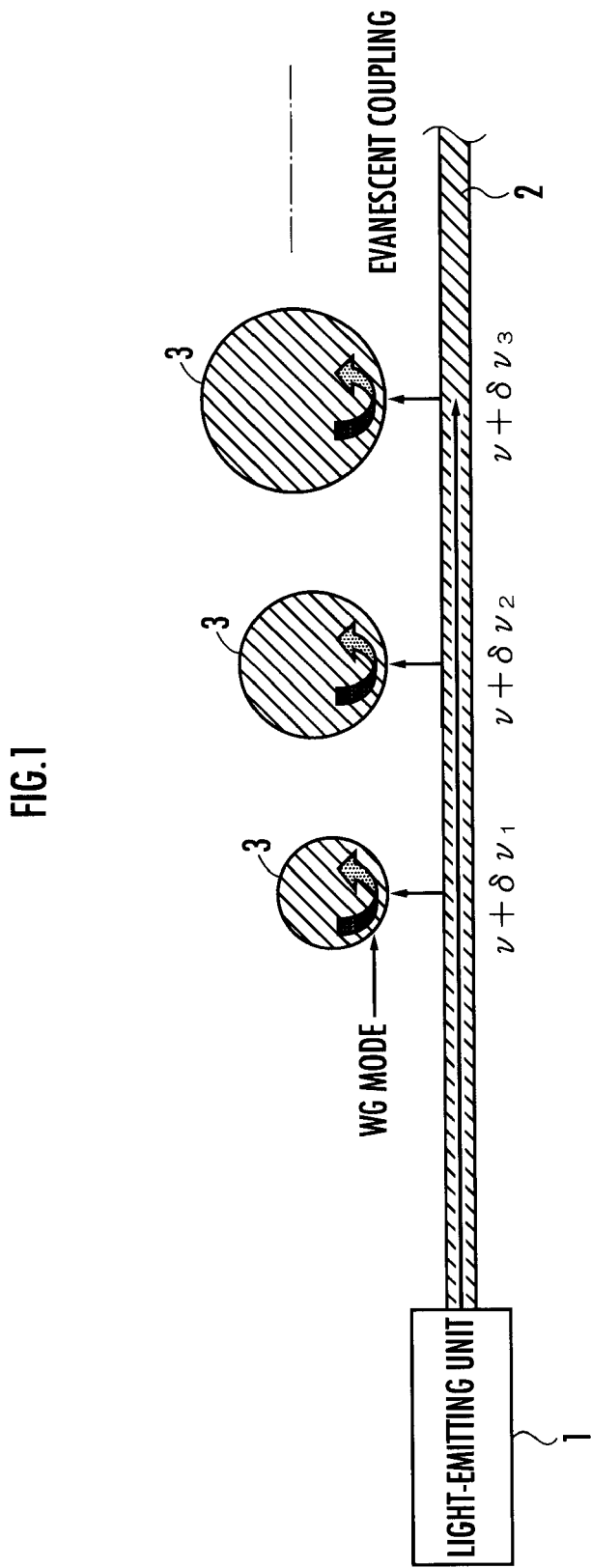
FIG. 1 is an explanatory diagram illustrating a principle of an image display device according to a first embodiment of the present invention.

As shown in FIG. 1, an image display device according to a first embodiment of the present invention includes a light-emitting unit 1 which emits light having predetermined frequencies, an optical fiber 2 which transmits light emitted from the light-emitting unit 1, and a plurality of spheres 3 coupled to the optical fiber 2 and having optical transparency.

The spheres 3 are disposed along a side face of the optical fiber 2 so as to be coupled to the optical fiber 2 by evanescent coupling. Moreover, the spheres 3 are each formed so as to provide an optical mode in which light entering each sphere from the optical fiber 2 by the evanescent coupling is confined inside. The optical mode is generally referred to as "Whispering-Gallery mode" (WG mode).

The following describes a relationship between the optical mode and the evanescent coupling of the spheres 3. First, light enters a complete microsphere, which thereby produces an optical mode (WG mode) in which the light is confined in the complete microsphere due to an interaction between an electromagnetic plane wave and the sphere. The optical mode of the sphere is specified by three indices, that is, the principal quantum number (order number) m, the orbital quantum number (angular number) n, and the azimuthal quantum number (azimuth) l and polarization TM or TE. In a complete sphere, degeneracy occurs in the optical mode with different m and the optical mode is specified as $TM_{1,n}$. In an actual sphere, however, the degeneracy is lifted in a complicated manner and therefore an optical mode similar to the WG mode occurs, instead of a complete WG mode.

Figure 2:
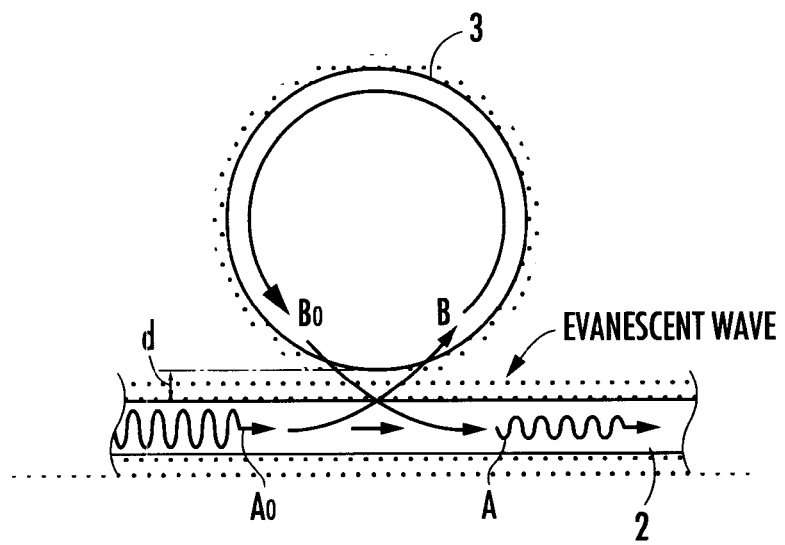
FIG. 2 is an explanatory diagram illustrating evanescent coupling and WG mode of the image display device in FIG. 1.
Figure 3:
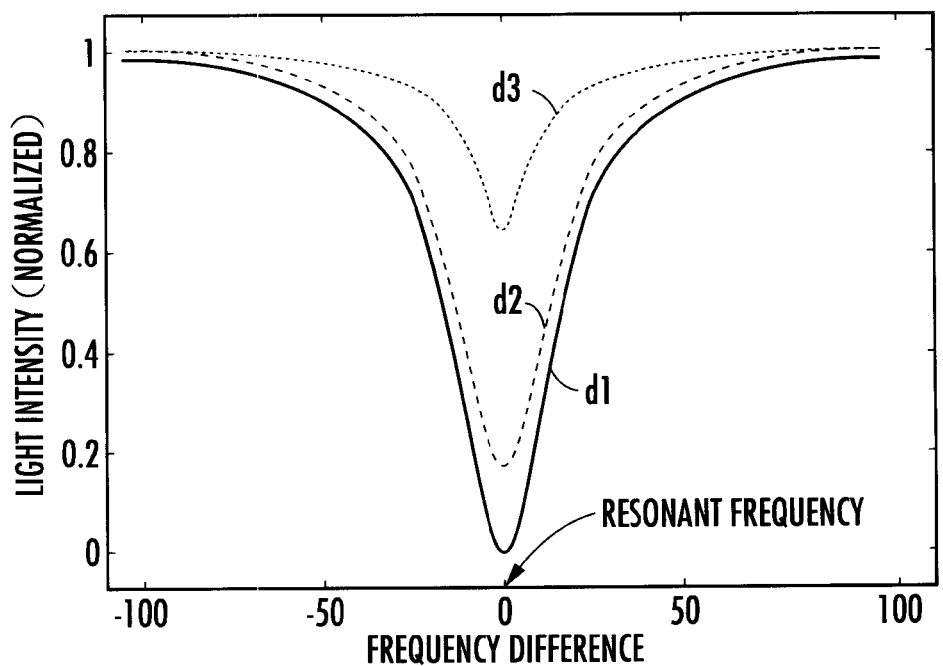
FIG. 3 is a graph illustrating a relationship between a frequency difference and a light intensity of the image display device in FIG. 1.

When the sphere 3 is then disposed in a position a distance d apart from the side face of the optical fiber 2 as shown in FIG. 2, light tunneling causes coupling of evanescent fields between the optical mode of the sphere 3 and the optical mode of the optical fiber 2. In this condition, light A0 that propagates through the optical fiber 2 enters the sphere 3 due to the evanescent coupling at a predetermined resonant frequency where the optical mode of the sphere 3 coincides with the optical mode of the optical fiber 2 and then the light A0 is confined inside the sphere 3 (indicated by the arrow B, B0 in FIG. 2). In the following description, this principle is referred to as "frequency drop." If an optical output A is thereby observed at the exit end of the optical fiber 2, a spectrum formed then shows a feature that looks as if light were absorbed at the predetermined resonant frequency as shown in FIG. 3. In the graph of FIG. 3, the horizontal axis represents the frequency difference from the resonant frequency and the vertical axis represents the normalized light intensity.

Moreover, FIG. 3 shows the cases of various distances d of the sphere (d=d1, d2, or d3). As shown, the quantity of light entering the sphere 3 depends on the distance d. Specifically, as the distance d between the optical fiber 2 and the sphere 3 decreases, the evanescent coupling from the optical fiber 2 to the sphere 3 is intensified, and therefore a larger quantity of light enters the sphere 3 from the optical fiber 2. On the other hand, the evanescent coupling from the sphere 3 to the optical fiber 2 is also intensified, thereby producing a process in which the light returns from the sphere 3 to the optical fiber 2 in reverse. The condition for a shift of almost all of the light from the optical fiber 2 to the sphere 3 depends on the absorption and scattering loss factor of the light inside the sphere 3 and the distance d between the optical fiber 2 and the sphere 3. Therefore, the optimization of the distance d and the like enables the light in the optical fiber 2 to be converted to the optical mode in the sphere 3 without loss. If some loss is permitted, the frequency drop is applicable to an image display device independently of the distance d between the optical fiber 2 and the sphere 3.

Specifically, a plurality of spheres 3 are secured to the optical fiber 2 or a predetermined substrate by using, for example, an adhesive. In this case, the distance d is controllable by the thickness of the adhesive and the position of the substrate. Alternatively, it is possible to couple the spheres 3 to the optical fiber 2 by means of intermolecular force (van der Waals force) without the use of a special adhesive since the intermolecular force acts between the spheres 3 and the optical fiber 2. In this case, however, it is difficult to control the distance d. Moreover, it is also possible to position the spheres 3 by using the intermolecular force before securing the spheres 3 by using an adhesive or the like.

Returning to FIG. 1, a plurality of the spheres 3 coupled to the optical fiber 2 are formed so as to be different in diameter from one another. Thereby, a plurality of the spheres 3 are so formed that the predetermined resonant frequencies of the spheres for producing the above optical mode are different from one another.

The relationship between the diameter of the sphere 3 and the resonant frequency will be described below. The scattered light energy $W_s$ of the light that impinges on the sphere 3 and is then scattered is represented by the following equation (1):

[Equation 1]

$$W_S = \pi \frac{E_0^2}{k_2^2} \sqrt{\frac{\varepsilon_2}{\mu_2}} \sum_{n=1}^{\infty} (2n+1)(|a_n^e|^2 + |b_n^e|^2) \tag{1}$$

In the above equation, $E_0$ is a DC component of the electric field, $k_2$ is a wave vector, $\varepsilon_2$ is a dielectric constant, $\mu_2$ is a magnetic permeability, $a_n^e$ and $b_n^e$ are coefficients used when a plane wave is expanded by vector spherical wave function.

Figure 4:
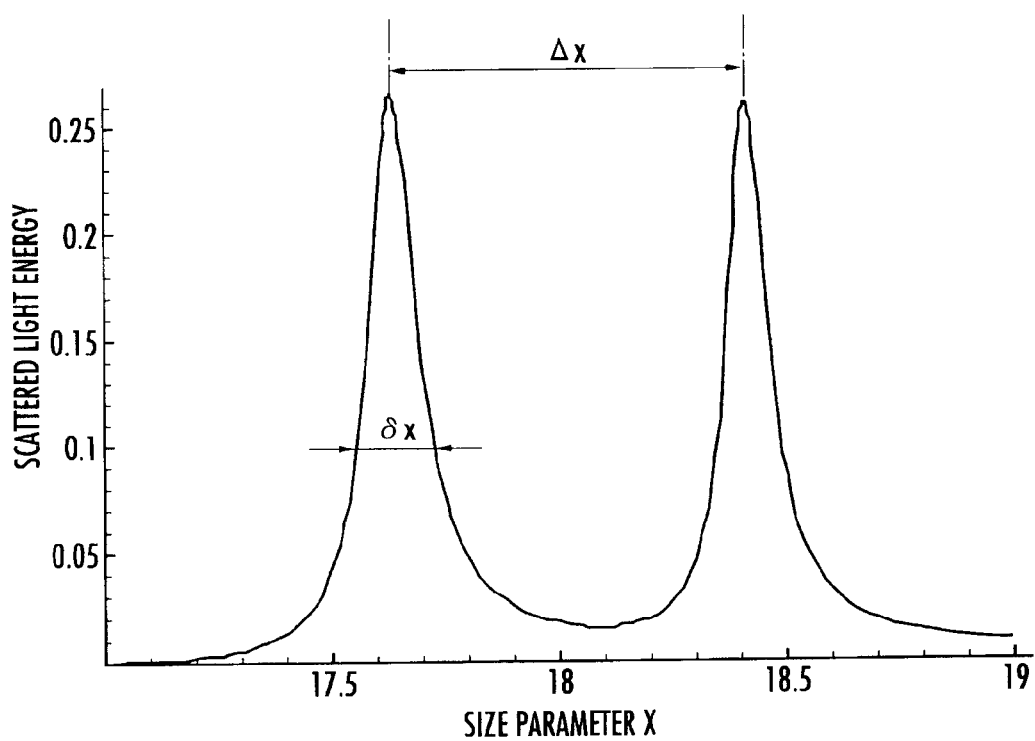
FIG. 4 is a graph illustrating a relationship between a size parameter and scattered light energy of the spheres of the image display device in FIG. 1.

For example, if a sum is made with respect to only the component of n=20 and the component of n=21 in the above equation (1), the spectrum is as shown in the graph of FIG. 4. In the graph of FIG. 4, the vertical axis represents the scattered light energy and the horizontal axis represents a size parameter X defined by $X=2\pi a/\lambda$ with "$\lambda$" as the wavelength and "a" as the radius of the sphere. Reading a frequency interval (free-spectral range [FSR]) $\Delta X$ and the frequency line width $\delta x$ from the spectrum shown in the graph of FIG. 4, $\Delta X$ is 0.74 and $\delta x$ is 0.107. Therefore, the finesse of the sphere (Finesse=$\Delta X/\delta x$) is on the order of 7. The finesse indicates the level of the number of spheres that can be disposed between 20 and 21 as n (the number of spheres allowed to have resonant frequencies different from one another within $\Delta X$).

In this case, there is a resonance peak at about X=18.5 as shown in the graph of FIG. 4. Therefore, this value is substituted for the size parameter X to determine the radius "a" of the sphere to be 1.8 µm. In this example, $\lambda$ is assumed to be 0.6 µm. Thereafter, the radius "a" is slightly varied in the vicinity of 1.8 µm (within the frequency interval $\Delta X$), thereby enabling the variation of the resonant frequencies of the spheres coupled by evanescent coupling. Therefore, the arrangement of a plurality of the spheres 3 having different diameters as shown in FIG. 1 enables the light emission of the spheres having resonant frequencies corresponding to the frequencies of the light propagating through the optical fiber 2 among a plurality of the spheres 3. In the example shown in FIG. 4, light is able to be emitted from the spheres 3 of the order of 7 by discretely varying the frequency value within the frequency interval $\Delta X$.

Although only seven pixels are able to be displayed with the spheres having a radius of 1.8 µm or so since up to seven resonance peaks occur within the frequency interval $\Delta X$ in the example shown in FIG. 4, the finesse of the spheres can be improved by appropriately selecting the radius "a" of the sphere using the above equation (1). This enables only one fiber to light a large number of spheres and consequently enables an image to be displayed by appropriately selecting frequencies.

For example, regarding a sphere having a radius around 5 µm, the frequency intervals $\Delta X$ of $TM_{1,\,60}$ and $TM_{1,\,61}$ and the frequency line width $\delta x$ of $TM_{1,\,61}$ are represented by size parameters as in the above example with n=60, 61. In this case, the frequency interval $\Delta X$ is 0.69 and the frequency line width $\delta x$ is obtained by $5.2 \times 10^{-6}$. Therefore, the finesse of the microsphere is on the order of $10^5$. In this condition, the size parameters X of the resonance peaks of $TM_{1,\,60}$ and $TM_{1,\,61}$ are $X(TM_{1,\,60})$=47.86 and $X(TM_{1,\,61})$=48.61. The radiuses of the spheres are determined from these values as follows: $a(TM_{1,\,60})$=4.57 µm and $a(TM_{1,\,61})$=4.64 µm. Therefore, theoretically it is possible to place $10^5$ microspheres by varying the radius between these radiuses of 4.57 µm and 4.64 µm of the spheres. Actually, however, the size is uncontrollable in an atomic layer or less and therefore $10^{-10}$ cm or so is the limit of the variation width of the radius of the microsphere. With the limit as the condition of constraint, it is theoretically possible to light about up to 1000 spheres.

The size of the sphere 3 is, for example, on the order of 1 to 100 μm in diameter. Moreover, the material of the sphere 3 is, for example, $SiO_2$ or $TiO_2$. The sphere 3 may be either dense or hollow and may include bubbles unless the optical mode is damaged.

For the arrangement of a plurality of the spheres 3 different in spherical diameter from one another along the side face of the optical fiber 2 as described above, there is a method of etching microspheres having the same size, for example.

Specifically, first, microspheres having the same size are prepared. In this preparation, the size of the microspheres is selected in conformity to the definition of the image display device to be manufactured. The microspheres having the same size (having a small standard deviation in diameter) may be, for example, polystyrene latex particles or silica particles as particle diameter standard particles.

Subsequently, a two-dimensional microsphere array film in which the microspheres are arranged is formed on a predetermined substrate by using the self-assembly method of monodisperse particles. For information about this process, refer to, for example, "Formation of colloidal crystal film," (color material, 76[2], 67-70, 2003), "Two-dimensional crystallization," (Nature, Vol. 361, 7 January, 1993), and "Fabrication of high-quality opal films with controllable thickness," (Chemistry of materials, Vol. 14, No. 2, pp. 760 to 765). The use of the methods described in these documents enables the formation of a two-dimensional microsphere array film with a simple device. In this formation, the type of microspheres, the type of solvent for dispersing microspheres, the density of the microspheres, and drying time are used as parameters for forming the self-assembled film.

Subsequently, microspheres having the same size are arbitrarily decreased in size by etching. For example, in the case of $SiO_2$ microspheres, etching is performed using dilute HF or HF vapor. Alternatively, etching may be performed using another gas such as plasma-treated $CHF_3$ ($CF_4+H_2$). This etching process makes a strong coupling between the substrate and the microspheres thereon to some extent. Moreover, the two-dimensional microsphere array film is gradually drawn out from the etching gas in the above, by which the microspheres can be reduced in size in the direction of the drawing motion.

Further, an optical fiber, a laser, and a frequency modulator are placed on the two-dimensional microsphere array film formed on the substrate and then connected to each other, thereby enabling the formation of the image display device.

Moreover, another method of arranging the microspheres is, for example, to form a two-dimensional microsphere array film on a substrate, which is formed of two-dimensionally arranged optical fibers, by using the self-assembly method as described above and then to control the size of the microspheres in the etching process as described above. In this case, it is required to use different materials for the optical fibers and the microspheres and to use an etching gas capable of selectively etching the microspheres. For example, if the optical fibers are formed of a material including Ge or fluoride and the microspheres are formed of $SiO_2$, it is possible to etch the microspheres selectively.

Figure 5:
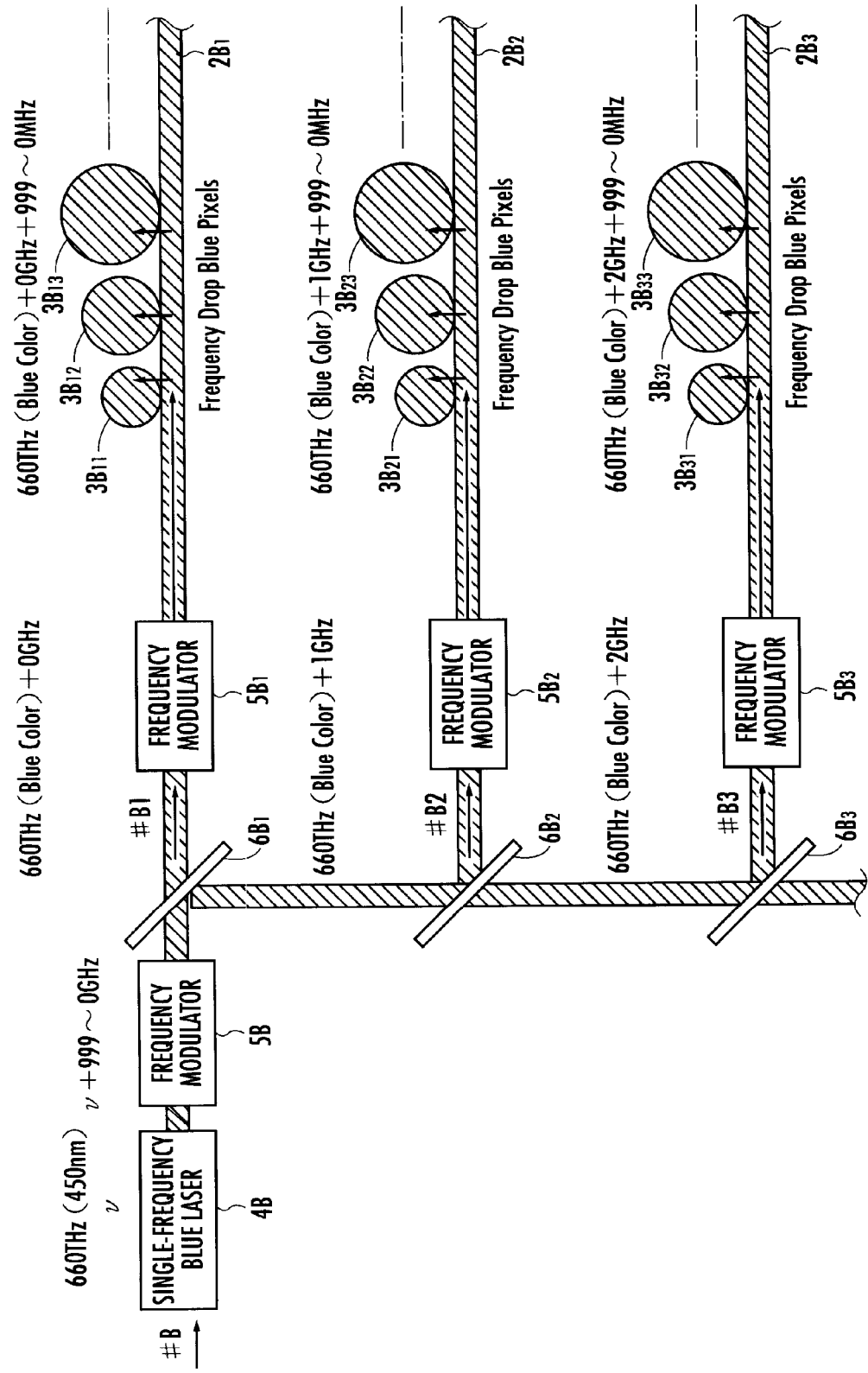
FIG. 5 is a block diagram of the image display device according to the first embodiment of the present invention.

Referring to FIG. 5, description will be made about the detailed structure of the image display device. Although FIG. 5 shows only the structure related to the display in blue color of the three primary colors, the same applies to the structure related to the display in each of red and green colors. Therefore, the display in blue color will be typically described below.

The image display device displays a color image composed of N×M pixels. The image display device has N optical fibers $2B_1$ to $2B_N$ where N is the number of lines of an image of the image display device and has M spheres $3B_{11}$ to $3B_{1M}$, $3B_{21}$ to $3B_{2M}$, - - - , and $3B_{N1}$ to $3B_{NM}$ different in diameter from one another, which are arranged along the corresponding side face of the optical fibers $2B_1$ to $2B_N$. In this embodiment, for example, N=1000 and M=1000.

A light-emitting unit 1 includes: a single-frequency blue laser 4B; a frequency modulator 5B for modulating the frequency of light emitted from the laser 4B; frequency filters $6B_1$ to $6B_N$ for extracting the light having frequencies corresponding to the optical fibers $2B_1$ to $2B_N$ of the respective lines from the light modulated by the frequency modulator 5B; and frequency modulators $5B_1$ to $5B_N$ for modulating the frequencies of the extracted light. FIG. 5 shows optical fibers and spheres of 3×3 pixels for convenience of illustration.

Specifically, the blue laser 4B emits blue light having a blue frequency of 660 THz (450 nm) for forming an image, for example. For the blue laser 4B, for example, a semiconductor excitation frequency-stabilized GaN laser is used. A green or red laser is, for example, a laser that emits light having a green frequency of 550 THz (550 nm) or having a red frequency of 460 THz (650 nm).

Moreover, the frequency modulators 5B and $5B_1$ to $5B_N$ use an electrooptic effect (an effect that a refractive index or the like changes when an electric field is applied to a substance that transmits light [for example, a dielectric crystal]) to modulate the frequencies of the transmitted light by the voltage application. The frequency modulator 5B modulates the frequency of the light (frequency ν) emitted from the laser 4B to ν+$δν_N$ (999 to 0 GHz). The frequency component of $δν_N$ (999 to 0 GHz) is used to specify the address of each line. For example, if $δν_N$ is 0 GHz, $δν_N$ indicates a first line (#B1). Furthermore, the frequency modulators $5B_1$ to $5B_N$ for the respective lines modulate the frequencies of light (frequency ν+$δν_N$) having propagated the optical fibers to ν+$δν_N$+$δν_M$ (999 to 0 MHz). The frequency component of $δν_N$ (999 to 0 MHz) specifies the address of the sphere on each line. The frequency filters $6B_1$ to $6B_N$ to be used are each required to have a band width on the order of 1 GHz.

The following describes the operation of the image display device according to this embodiment. Hereinafter, the operation will be described for the display in blue color. First, the single-frequency blue laser 4B emits blue light (frequency ν) of 660 THz. Subsequently, the frequency modulator 5B modulates the frequency of the emitted light (ν+$ν_N$ [999 to 0 GHz]). Thereafter, the frequency filters $6B_1$ to $6B_N$ assign the frequency-modulated light to the optical fibers $2B_1$ to $2B_N$ of the respective lines. Then, the frequency modulators $5B_1$ to $5B_N$ modulate the frequencies of the light assigned to the respective lines (ν+$ν_N$+$ν_M$ [999 to 0 MHz]). This causes the light having the frequencies of ν+$ν_N$ (999 to 0 GHz)+$ν_M$ (999 to 0 MHz) to propagate through the optical fibers $2B_1$ to $2B_N$ and thereby produces evanescent coupling between the optical fibers $2B_1$ to $2B_N$ and the spheres. Thereafter, the light propagating through each of the optical fibers $2B_1$ to $2B_N$ enters a predetermined sphere having the resonant frequency corresponding to the frequency and produces the WG mode inside the sphere. Then, the light in the WG mode exits the sphere and thereby the sphere emits light. For example, if the frequency-modulated optical frequency is 660 THz+0 GHz+0 MHz, a sphere $3B_{11}$ emits light in blue.

The image display device displays an image by repeating the above processing a predetermined number of times at high speed to light the spheres corresponding to the predetermined pixels of the image. Further, the image display device displays a color image by performing the processing of displaying in green and red colors in the same manner as the processing of displaying in blue color described above.

The light emitted from a single-frequency blue laser is frequency-modulated and assigned to a line in this embodiment. In another embodiment, however, it is alternatively possible to prepare single-frequency blue lasers (for example, blue frequency stabilized semiconductor lasers) by the number of lines so that the lasers are respectively assigned to the lines by means of external electrical signals. The same applies to the displays in green and red colors. In this case, it is preferable to use frequency stabilized lasers each having a line width on the order of kHz in order to achieve clear resonance.

Further, in this embodiment, a plurality of the spheres are so formed that resonant frequencies of the spheres are different from one another by varying the spherical diameters of the spheres. The different resonant frequencies, however, are achieved by means of the refractive indices of the spheres. Therefore, for example, in cases where the microspheres are made of glass, the glass microspheres having the same size but different in glass refractive index may be mixed, so that the spheres slightly different in refractive index but having the same radius are arranged on the optical fibers.

Second Embodiment

Figure 6:
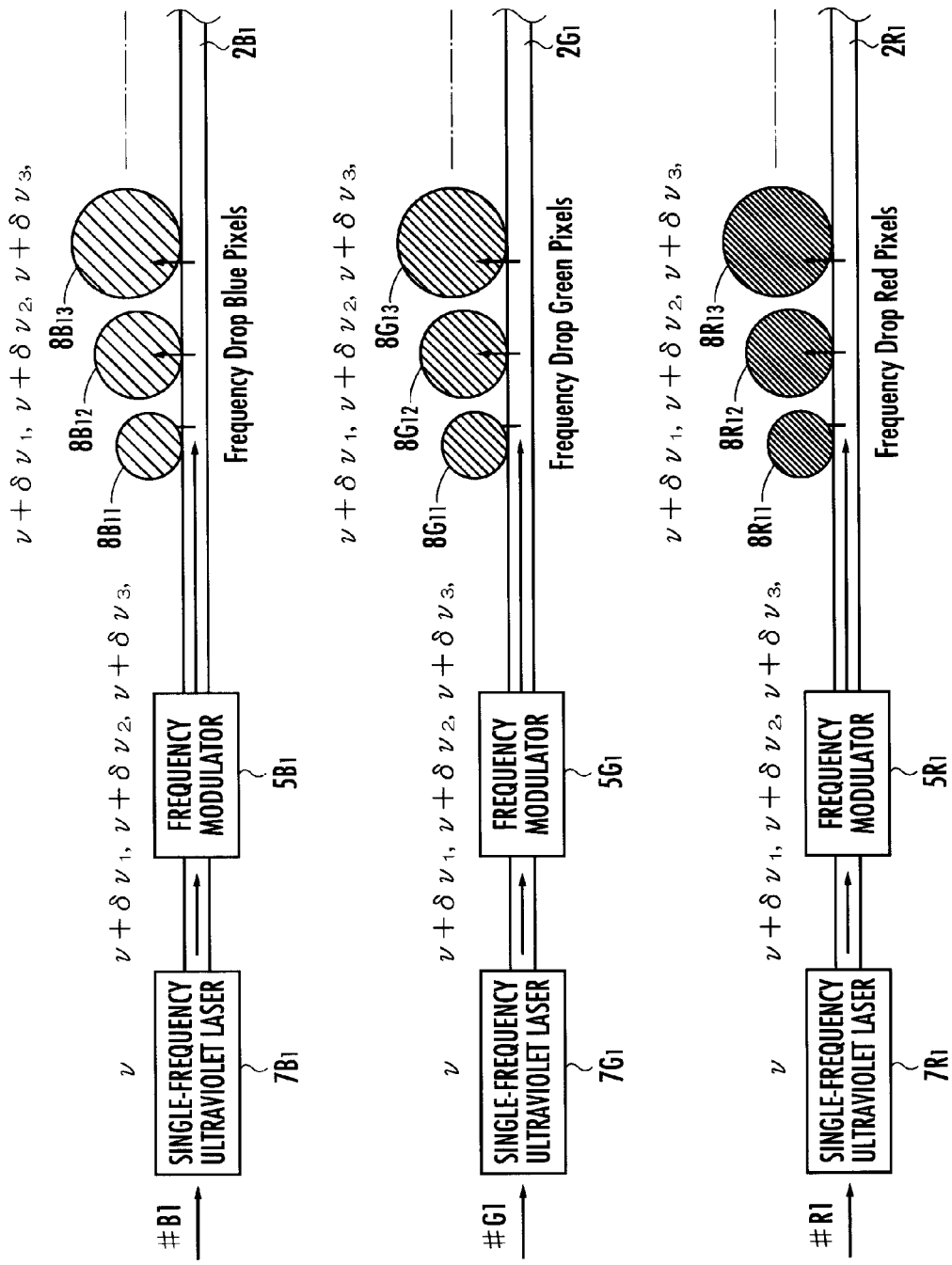
FIG. 6 is a block diagram of an image display device according to a second embodiment of the present invention.

As shown in FIG. 6, the image display device according to a second embodiment of the present invention uses single-frequency ultraviolet lasers for providing the three primary colors as light emitters. Furthermore, the image display device uses microspheres respectively containing phosphors that exhibit blue, green, and red emission by absorbing ultraviolet light. Except this point, the basic principle of the image display device according to this embodiment is the same as the first embodiment.

The image display device displays a color image composed of N×M pixels in the same manner as in the first embodiment. For the display in blue color, the image display device has N optical fibers $2B_1$ to $2B_N$ where N is the number of lines of the image. The image display device further has M spheres $8B_{11}$ to $8B_{1M}$, $8B_{21}$ to $8B_{2M}$, - - - , and $8B_{N1}$ to $8B_{NM}$ different in diameter from one another arranged along the corresponding side face of the optical fibers $2B_1$ to $2B_N$. Further, a light-emitting unit includes single-frequency ultraviolet lasers $7B_1$ to $7B_N$ and frequency modulators $5B_1$ to $5B_N$ for modulating the frequencies of light emitted from the lasers $7B_1$ to $7B_N$. The same applies to the displays in green and red colors. FIG. 6 shows the illustration only for three pixels of one line (#B1, #G1, or #R1) of the image for each of the blue, green, and red colors.

For the ultraviolet lasers 7B, 7G, and 7R, for example, semiconductor excitation frequency-stabilized 355-nm YAG lasers are used. Moreover, spheres 8B, 8G, and 8R respectively contain phosphors that exhibit blue, green, and red emission by absorbing ultraviolet light such as, for example, Eu or other rare-earth elements or transition metal elements. The basic composition of the spheres 8B, 8G, and 8R other than the above is the same as the spheres 3 of the first embodiment.

As to the method of forming the microspheres containing the phosphors, for example, monodisperse-phosphor-doped $TiO_2$ microspheres controlled in size can be formed by using a liquid phase deposition process as described in "Observation of whispering gallery modes in cathode luminescence in $TiO_2$:$Eu^{3+}$ microspheres," (Applied Physics Letters, 89, 061126 [2006]).

The following describes the operation of the image display device according to this embodiment. First, in the processing of the display in blue color in the line #B1 shown in FIG. 6, the single-frequency ultraviolet laser $7B_1$ emits ultraviolet light (frequency ν). Subsequently, the frequency modulator $5B_1$ modulates the frequencies of the emitted light (ν+δν$_1$, ν+δν$_2$, ν+δν$_3$) and the light having the predetermined frequencies propagates through the optical fiber $2B_1$, by which evanescent coupling is produced between the optical fiber $2B_1$ and the spheres $8B_{11}$ to $8B_{13}$. Thereafter, the light propagating through the optical fiber $2B_1$ enters predetermined spheres having resonant frequencies corresponding to the frequencies and produces the WG mode inside the spheres. Subsequently, the light in the WG mode excites the phosphors contained in the spheres, by which the spheres emit light. For example, if the frequency-modulated optical frequency is ν+δν$_1$, the sphere $8B_{11}$ emits light in blue. In this manner, it is possible to cause the microspheres corresponding to various frequency-modulated optical frequencies to emit light in blue. The same processing is performed in the lines #G1 and #R1 to enable the microspheres corresponding to various frequency-modulated optical frequencies to emit light in green and red, respectively. The above processing is repeated in all lines.

With the above operation, a color image is displayed in the same manner as in the first embodiment. According to this embodiment, the image display device can be formed by using one type of lasers.

Although the image display device includes a plurality of ultraviolet lasers as light emitters in this embodiment, the image display device may include, for example, only one ultraviolet laser and display an image by assigning light emitted from the ultraviolet laser to the addresses of the lines of the respective colors by using a frequency modulator or a frequency filter in another embodiment.

Third Embodiment

Figure 7:
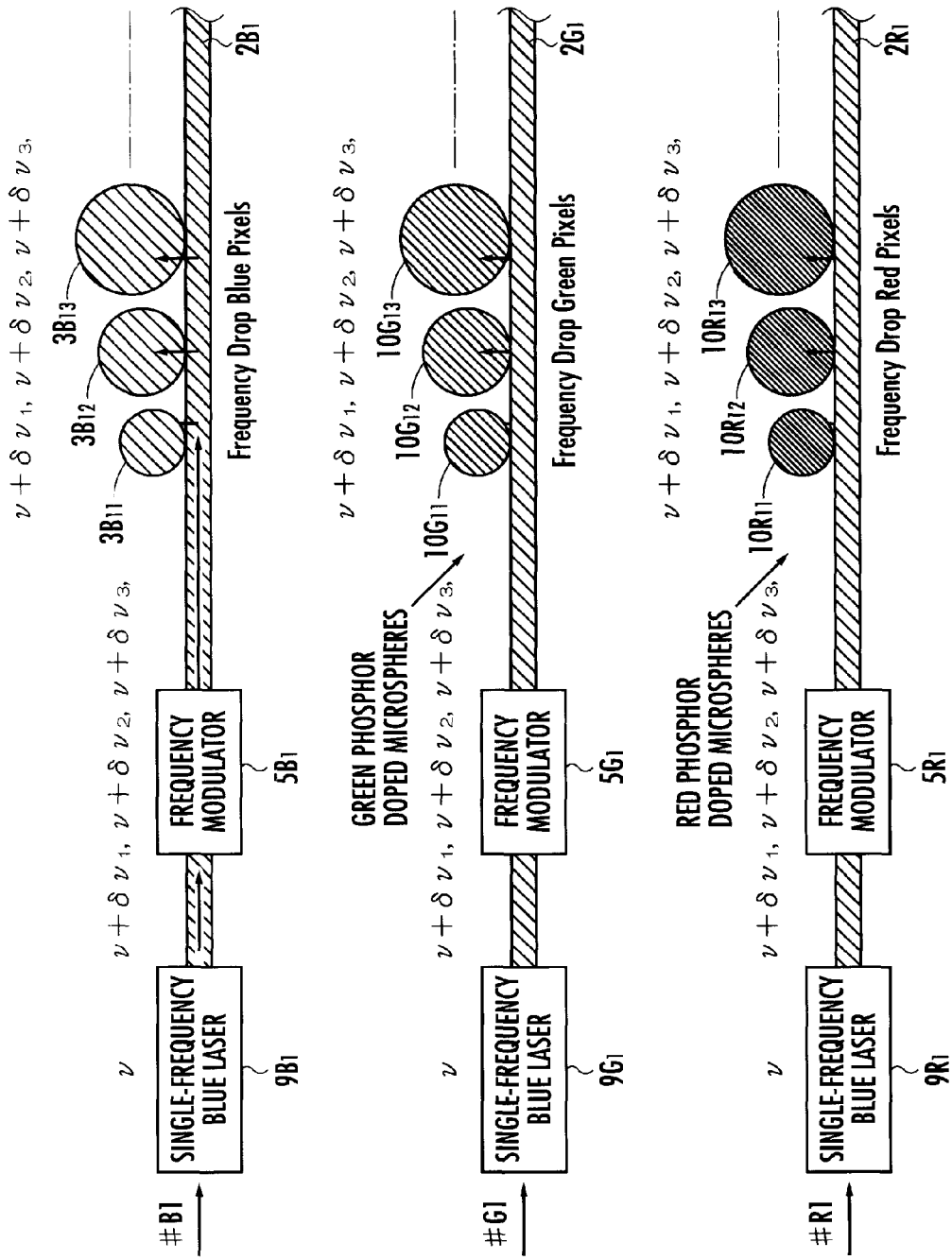
FIG. 7 is a block diagram of an image display device according to a third embodiment of the present invention.

As shown in FIG. 7, the image display device according to a third embodiment of the present invention uses single-frequency blue lasers for providing the three primary colors as light emitters. Furthermore, the image display device uses the same microspheres as in the first embodiment and microspheres respectively containing phosphors that exhibit green and red emission by absorbing blue light. Except this point, the basic principle of the image display device according to this embodiment is the same as the first embodiment.

The image display device displays a color image composed of N×M pixels in the same manner as in the first embodiment. For the display in blue color, the image display device has N optical fibers $2B_1$ to $2B_N$ where N is the number of lines of the image. The image display device further has M spheres $3B_{11}$ to $3B_{1M}$, $3B_{21}$ to $3B_{2M}$, - - - , and $3B_{N1}$ to $3B_{NM}$ different in diameter from one another arranged along the corresponding side face of the optical fibers $2B_1$ to $2B_N$. Further, a light-emitting unit includes single-frequency blue lasers $9B_1$ to $9B_N$ and frequency modulators $5B_1$ to $5B_N$ for modulating the frequencies of light emitted from the lasers $9B_1$ to $9B_N$. The same applies to the displays in green and red colors. FIG. 7 shows the illustration only for three pixels of one line (#B1, #G1, or #R1) of the image for each of the blue, green, and red colors.

A sphere 10G for the display in green color contains a phosphor that exhibits green emission under blue excitation and a sphere 10R for the display in red color contains a phosphor that exhibits red emission under blue excitation. These phosphors are, for example, Rhodamine 560 (R560, manufactured by Exciton, Inc., USA) for green and Rhodamine 640 (R640, manufactured by Exciton, Inc., USA) for red as organic coloring matters. Moreover, the phosphors may be inorganic phosphors such as rare-earth-doped ($Eu^{2+}$) β-sialon-based phosphors for both of red and green colors. Sialon is a solid solution of silicon nitride and a phosphor is formed by dissolving optically-active Eu ion ($Eu^{2+}$) with the solid solution.

The phosphors contained in the spheres enable arbitrary spheres to emit fluorescent light of predetermined colors by means of the light emitted from the blue lasers. In the case of using phosphors, however, the light in the WG mode formed inside the spheres is absorbed and thus the line width of the resonant spectrum shown in FIG. 3 is greater than the case of not using phosphors. This decreases the finesse of the spheres and therefore slightly decreases the number of spheres (the number of pixels) that can be arranged.

The following describes the operation of the image display device according to this embodiment. First, in the processing of the display in blue color in the line #B1 shown in FIG. 7, the single-frequency blue laser $9B_1$ emits blue light (frequency ν). Subsequently, the frequency modulator $5B_1$ modulates the frequencies of the emitted light ($ν+ν_1, ν+δν_2, ν+δν_3$) and the light having the predetermined frequencies propagates through the optical fiber $2B_1$, by which evanescent coupling is produced between the optical fiber $2B_1$ and the spheres $3B_{11}$ to $3B_{13}$. Thereafter, the light propagating through the optical fiber $2B_1$ enters predetermined spheres having resonant frequencies corresponding to the frequencies and produces the WG mode inside the spheres. Subsequently, the light in the WG mode exits the spheres and thereby the spheres emit light. For example, if the frequency-modulated optical frequency is $ν+δν_1$, the sphere $3B_{11}$ emits light in blue.

The same processing is performed in the lines #G1 and #R1 to enable the microspheres corresponding to various frequency-modulated optical frequencies to emit light in green and red, respectively. In this processing, the light in the WG mode excites the phosphors contained in the spheres and thereby the spheres emit light in green and red in the lines #G1 and #R1, respectively. The above processing is repeated in all lines.

With the above operation, a color image is displayed in the same manner as in the first embodiment. According to this embodiment, the image display device can be formed by using one type of lasers.

Although the image display device includes the plurality of blue lasers as light emitters in this embodiment, the image display device may include, for example, only one blue laser and display an image by assigning light emitted from the blue laser to the addresses of the lines of the respective colors by using a frequency modulator or a frequency filter in another embodiment.

Fourth Embodiment

Figure 8:
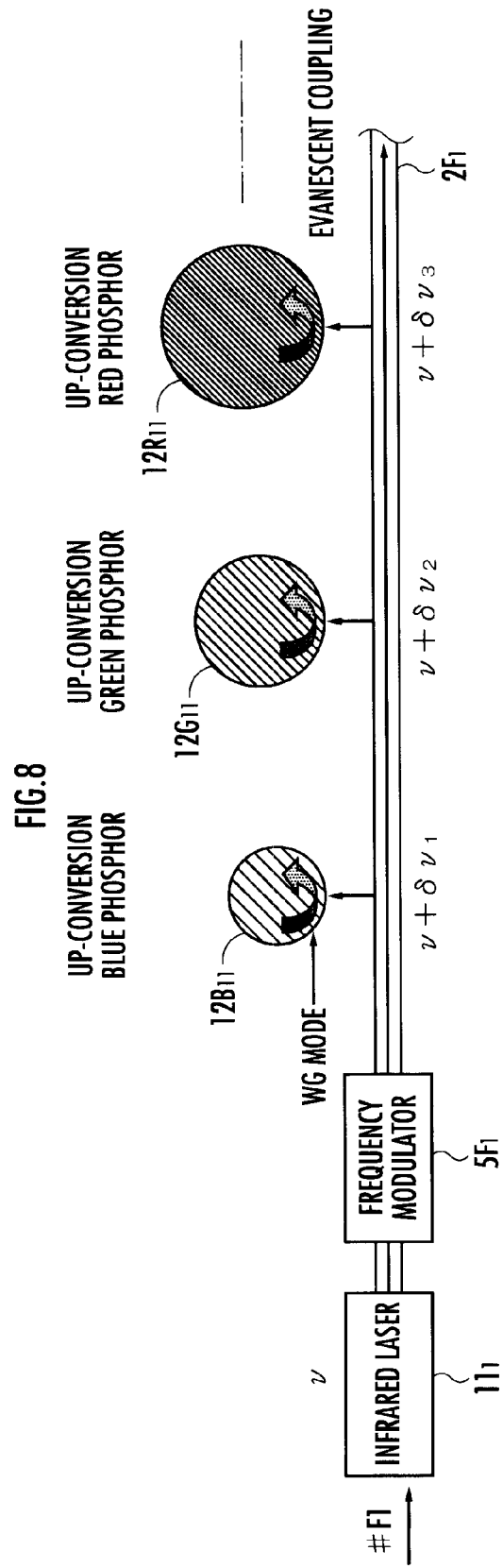
FIG. 8 is an explanatory diagram illustrating the principle of an image display device according to a fourth embodiment of the present invention.

As shown in FIG. 8, the image display device according to a fourth embodiment of the present invention uses single-frequency infrared lasers as light emitters. Furthermore, the image display device uses microspheres containing up-conversion phosphors that exhibit blue, green, and red emission by absorbing infrared light to emit light from the microspheres by using nonlinear emission. Except this point, the basic principle of the image display device according to this embodiment is the same as the first embodiment.

The image display device according to this embodiment displays a color image composed of N×M pixels in the same manner as in the first embodiment. The image display device has N optical fibers $2F_1$ to $2F_N$ where N is the number of lines of the image. The image display device further has 3M spheres $12B_{11}$ to $12B_{NM}$, $12G_{11}$ to $12G_{NM}$, - - -, and $12R_{11}$ to $12R_{NM}$ arranged along the corresponding side face of the optical fibers $2F_1$ to $2F_N$. For example, on the optical fiber $2F_1$, M spheres for each color are arranged in the order of blue, green, and red such as $12B_{11}$, $12G_{11}$, $12R_{11}$, $12B_{12}$, $12G_{12}$, $12R_{12}$, - - -, $12B_{1M}$, $12G_{1M}$, and $12R_{1M}$ with respect to spheres 12B, 12G, and 12R, which are different in diameter from one another.

Further, a light-emitting unit includes N frequency-stabilized infrared lasers $11_1$ to $11_N$ and frequency modulators $5F_1$ to $5F_N$ for respectively modulating the frequencies of light emitted from the lasers $11_1$ to $11_N$. FIG. 8 shows the illustration only for one pixel of one line (#F1) of the image.

The spheres 12B, 12G, and 12R contain up-conversion phosphors that exhibit blue, green, and red emission by being excited by infrared light, respectively. As these up-conversion phosphors, it is possible to use, for example, fluoride glass containing $Yb^{3+}$ and $Eu^{2+}$ rare earth ions.

In cases where the microspheres 12B, 12G, and 12R produce the WG mode, the Q-value of the light confined inside the spheres ranges from $10^{10}$ to $10^{21}$, which is extremely high. Therefore, the light energy inside the spheres is large enough to extract optical nonlinear effect. As such, the emission energy relative to the input light energy nonlinearly increases due to an increase in effect of higher terms. Therefore, infrared light of low energy entering the microspheres 12B, 12G, and 12R efficiently excites the up-conversion phosphors, thereby causing light emission of the predetermined colors. In the case of using up-conversion phosphors, however, the line width of the resonant spectrum shown in FIG. 3 is greater than the case of not using the phosphors. This decreases the finesse of the spheres and therefore slightly decreases the number of spheres (the number of pixels) that can be arranged. The basic composition of the spheres 12B, 12G, and 12R other than the above is the same as the spheres 3 of the first embodiment.

The following describes the operation of the image display device according to this embodiment. First, in the processing in the line #F1 shown in FIG. 8, the single-frequency infrared laser $11B_1$ emits infrared light (frequency ν). Subsequently, the frequency modulator $5F_1$ modulates the frequencies of the emitted light ($ν+δν_1, ν+δν_2, ν+δν_3$) and the light having the predetermined frequencies propagates through the optical fiber $2F_1$, by which evanescent coupling is produced between the optical fiber $2F_1$ and the spheres $12B_{11}, 12G_{11}$, and $12R_{13}$. Thereafter, the light propagating through the optical fiber $2F_1$ enters predetermined spheres having resonant frequencies corresponding to the frequencies and produces the WG mode inside the spheres. Subsequently, the light in the WG mode excites the phosphors contained in the spheres and thereby the spheres emit light. For example, if the frequency-modulated optical frequency is $ν+δν_1$, the sphere $12B_{11}$ emits light in blue. Moreover, for example, if the frequency-modulated optical frequency is $ν+δν_2$, the sphere $12G_{11}$ emits light in green. In this manner, it is possible to cause the microspheres corresponding to various frequency-modulated optical frequencies to emit light of the predetermined colors. The above processing is repeated in all lines.

The above operation enables an image to be displayed in the same manner as in the first embodiment. According to this embodiment, the image display device can be formed by using infrared lasers which are easily-available and inexpensive.

Although the image display device includes N infrared lasers where N is the number of lines of the image in this embodiment, the light emitted from one infrared laser may be assigned to the addresses of the lines by using a frequency modulator or a frequency filter in the same manner as in the first embodiment.

Fifth Embodiment

Figure 9:
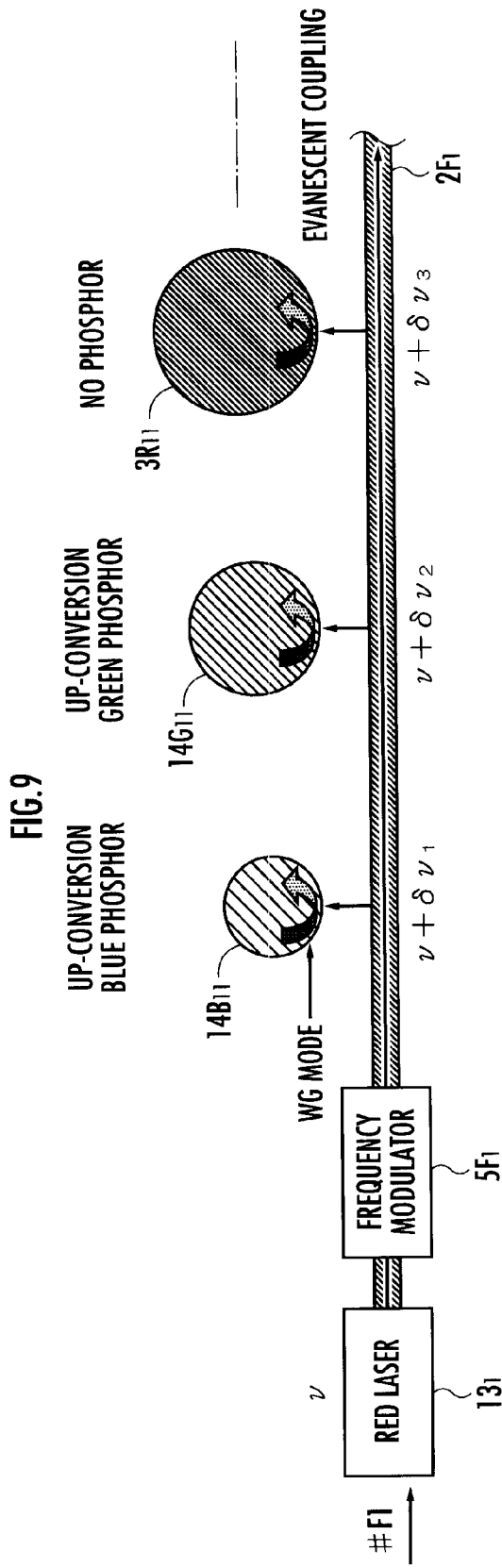
FIG. 9 is an explanatory diagram illustrating the principle of an image display device according to a fifth embodiment of the present invention.

As shown in FIG. 9, the image display device according to a fifth embodiment of the present invention uses red lasers as light emitters. Furthermore, the image display device uses microspheres containing up-conversion phosphors in the same manner as in the fourth embodiment as microspheres for blue and green colors and microspheres not containing phosphors in the same manner as in the first embodiment as the microspheres for red color. Except this point, the basic principle of the image display device according to this embodiment is the same as the first embodiment.

The image display device according to this embodiment displays a color image composed of N×M pixels in the same manner as in the first embodiment. The image display device has N optical fibers $2F_1$ to $2F_N$ where N is the number of lines of the image in the same manner as in the fourth embodiment. The image display device further has 3M spheres $14B_{11}$ to $14B_{NM}$, $14G_{11}$ to $14G_{NM}$, - - - , and $3R_{11}$ to $3R_{NM}$ arranged along the corresponding side face of the optical fibers $2F_1$ to $2F_N$. For example, on the optical fiber $2F_1$, M spheres for each color are arranged in the order of blue, green, and red such as $14B_{11}$, $14G_{11}$, $3R_{11}$, $14B_{12}$, $14G_{12}$, $3R_{12}$, - - - , $14B_{1M}$, $14G_{1M}$, and $3R_{1M}$, with respect to spheres 14B, 14G, and 3R, which are different in diameter from one another.

Further, a light-emitting unit includes N frequency-stabilized red lasers $13_1$ to $13_N$ and frequency modulators $5F_1$ to $5F_N$ for respectively modulating the frequencies of light emitted from the lasers $13_1$ to $13_N$. FIG. 9 shows the illustration only for one pixel of one line (#F1) of the image.

The spheres 14B and 14G contain up-conversion phosphors that emit blue and green light by being excited by red light, respectively. These up-conversion phosphors are, for example, fluoride glass containing $Yb^{3+}$ and $Eu^{2+}$ rare earth ions. Similarly to the fourth embodiment, in cases where the microspheres 14B and 14G produce the WG mode, the emission energy relative to the input light energy nonlinearly increases. Therefore, red light of low energy entering the microspheres 14B and 14G efficiently excites the up-conversion phosphors, thereby causing light emission of the predetermined colors. The basic composition of the spheres 14B, 14G, and 3R other than the above is the same as the spheres 3 of the first embodiment.

The following describes the operation of the image display device according to this embodiment. First, in the processing in the line #F1 shown in FIG. 9, the single-frequency red laser $13B_1$ emits red light (frequency ν). Subsequently, the frequency modulator $5F_1$ modulates the frequencies of the emitted light (ν+δν$_1$, ν+δν$_2$, ν+δν$_3$) and the light having the predetermined frequencies propagates through the optical fiber $2F_1$, by which evanescent coupling is produced between the optical fiber $2F_1$ and the spheres $14B_{11}$, $14G_{11}$, and $3R_{11}$. Thereafter, the light propagating through the optical fiber $2F_1$ enters predetermined spheres having resonant frequencies corresponding to the frequencies and produces the WG mode inside the spheres.

In this condition, for example, if the frequency-modulated optical frequency is ν+δν$_1$, the WG mode is produced inside the sphere $14B_{11}$. Then, the light in the WG mode excites the phosphor contained in the sphere $14B_{11}$, by which the sphere $14B_{11}$ emits light in blue. Moreover, for example, if the frequency-modulated optical frequency is ν+δν$_3$, the WG mode is produced inside the sphere $3R_{11}$. Then, the light in the WG mode exits the sphere $3R_{11}$, by which the sphere $3R_{11}$ emits light in red. In this manner, it is possible to cause the microspheres corresponding to various frequency-modulated optical frequencies to emit light of the predetermined colors. The above processing is repeated in all lines.

The above operation enables an image to be displayed in the same manner as in the first embodiment. According to this embodiment, the image display device can be formed by using red lasers which are easily-available and inexpensive.

Although the image display device includes N red lasers where N is the number of lines of the image in this embodiment, the light emitted from one red laser may be assigned to the addresses of the lines by using a frequency modulator or a frequency filter in the same manner as in the first embodiment.

INDUSTRIAL APPLICABILITY

As described above, the present invention provides a simply structured image display device having a high response speed and capable of achieving power saving, a high luminance, a wide view angle, and a high contrast, and therefore the invention is adapted for use in various industries related to communication.

The invention claimed is:

1. An image display device comprising:
   a light-emitting unit including a single light emitter configured to emit light having a predetermined frequency, and a single first frequency modulator configured to modulate the frequency of the light emitted from the light emitter, the light emitter configured to emit the light having the predetermined frequency to the first frequency modulator;
   an optical fiber which transmits light emitted from the light-emitting unit; and
   a plurality of spheres disposed so as to be coupled to the optical fiber by evanescent coupling and having optical transparency, wherein:
   the plurality of the spheres each produce an optical mode in which light entering each sphere from the optical fiber by the evanescent coupling is confined inside and are so formed that predetermined resonant frequencies of the spheres for producing the optical mode are different from one another;
   the optical fiber provides a plurality of lines, each of said plurality of lines provided with a second frequency modulator and a plurality of spheres, the first frequency modulator is configured to modulate the light emitted from the light emitter to a light having a frequency specifying an N-th line among the plurality of lines, and each of the second frequency modulators is configured to further modulate the modulated light to a light having a resonant frequency of an M-th sphere among the plurality of spheres on the N-th line; and
   the first frequency modulator and the second frequency modulators are configured to modulate the frequency of the light emitted from the light emitter to correspond to the predetermined resonant frequency of particular spheres selected as a subset of the plurality of spheres such that light is emitted only from said particular spheres and an image is displayed by the light emitted from said particular spheres.

2. The image display device according to claim 1, wherein a plurality of the spheres are so formed that the diameters of the spheres are different from one another.

3. The image display device according to claim 1, wherein a plurality of the spheres are so formed that the refractive indices of the spheres are different from one another.

4. The image display device according to claim 1, wherein:
the light-emitting unit includes light emitters which emit light of red, blue, and green colors, respectively;
a plurality of the spheres are divided into three groups: a plurality of red spheres that emit red light propagating from the light-emitting unit; a plurality of blue spheres that emit blue light propagating from the light-emitting unit; and a plurality of green spheres that emit green light propagating from the light-emitting unit; and
a color image is displayed by the light emitted from the red spheres, the blue spheres, and the green spheres.

5. The image display device according to claim 1, wherein:
the light-emitting unit includes light emitters that emit light other than red, blue, and green light; and
a plurality of the spheres contain phosphors that exhibit predetermined color emission by absorbing the light propagating from the light-emitting unit, so that an image is displayed by the emission.

6. The image display device according to claim 5, wherein:
a plurality of the spheres are divided into three groups: a plurality of red spheres each containing a phosphor that exhibits red emission; a plurality of blue spheres each containing a phosphor that exhibits blue emission; and a plurality of green spheres each containing a phosphor that exhibits green emission; and
a color image is displayed by the light emitted from the red spheres, the blue spheres, and the green spheres.

7. The image display device according to claim 5, wherein:
the light emitters are infrared lasers; and
the phosphors are up-conversion phosphors that emit light at frequencies higher than an excitation frequency.

8. The image display device according to claim 1, wherein:
the light-emitting unit includes light emitters that emit light of a predetermined color among red, blue, and green;
a plurality of the spheres are divided into two groups: a plurality of spheres having a predetermined color that emit light propagating from the light-emitting unit; and a plurality of spheres having colors other than the predetermined color and containing phosphors that exhibit emission of colors other than the predetermined color among red, blue, and green by absorbing the light propagating from the light-emitting unit; and
a color image is displayed by the light emitted from the spheres having the predetermined color and the spheres having the colors other than the predetermined color.

9. The image display device according to claim 1, wherein the first frequency modulator and the second frequency modulators are configured to select said particular spheres from among the plurality of spheres as those spheres which correspond to predetermined pixels of the image, and to modulate the frequency of the light emitted from the light emitter to correspond to the resonant frequency of said particular spheres such that the light emitted from the light emitter and modulated by the first frequency modulator and the second frequency modulators enters and is confined inside only said particular spheres and causes only said particular spheres to emit light.

10. The image display device according to claim 9, wherein each of the plurality of spheres is configured such that only light having a frequency which corresponds to the resonant frequency of the sphere will enter and be confined inside the sphere.

11. The image display device according to claim 1, wherein each of the plurality of spheres and the optical fiber are secured at a fixed distance from one another.

12. The image display device according to claim 1, wherein the predetermined resonant frequency for each sphere is fixed.

13. The image display device according to claim 1, wherein the first frequency modulator includes a substance which transmits light disposed such that light emitted from the light emitter passes therethrough, and the first frequency modulator is configured to modulate the frequency of light emitted from the light emitter by performing high-speed optical frequency modulation using an electrooptic effect wherein an electric field is applied to the substance such that a refractive index of the substance changes.

14. The image display device according to claim 1, wherein the single first frequency modulator is disposed upstream from all of the second frequency modulators, all of the plurality of lines, and all of the plurality of spheres in a direction of transmission of light emitted from the light emitter along the optical fiber, and each second frequency modulator is disposed upstream from all of the plurality of spheres provided on the line with the second frequency modulator in a direction of transmission of light emitted from the light emitter along each of said plurality of lines.

15. The image display device according to claim 1, wherein the first frequency modulator is disposed upstream from the plurality of spheres in a direction of transmission of the light emitted from the light emitter along the optical fiber path, and the first frequency modulator is configured to modulate the frequency of the light emitted from the light emitter prior to the light emitted from the light emitter reaching the plurality of spheres.

16. The image display device according to claim 15, wherein the first frequency modulator is disposed upstream from all of the plurality of spheres in a direction of transmission of the light emitted from the light emitter along the optical fiber path.

17. The image display device according to claim 1, wherein each of the plurality of spheres is configured such that only light having a frequency which corresponds to the resonant frequency of the sphere will enter and be confined inside the sphere.

18. The image display device according to claim 1, wherein the first frequency modulator and the second frequency modulators are configured to variably modulate the frequency of the light emitted from the light emitter.

* * * * *